US 6,855,303 B1

(12) United States Patent
Mowery-Evans et al.

(10) Patent No.: US 6,855,303 B1
(45) Date of Patent: Feb. 15, 2005

(54) METHOD FOR SELECTIVE CATALYTIC REDUCTION OF NITROGEN OXIDES

(75) Inventors: Deborah L. Mowery-Evans, Broomfield, CO (US); Timothy J. Gardner, Albuquerque, NM (US); Linda I. McLaughlin, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/601,255

(22) Filed: Jun. 19, 2003

(51) Int. Cl.$^7$ .............................. B01J 8/00; C01B 21/00
(52) U.S. Cl. .................................. 423/239.1; 423/235
(58) Field of Search .............................. 423/235, 239.1

(56) References Cited

U.S. PATENT DOCUMENTS

| | | | |
|---|---|---|---|
| 4,511,455 A | | 4/1985 | Dosch et al. |
| 4,735,927 A | * | 4/1988 | Gerdes et al. ................. 502/64 |
| 4,929,582 A | | 5/1990 | Dosch et al. |
| 5,409,681 A | * | 4/1995 | Kato et al. ............... 423/239.1 |
| 5,461,022 A | | 10/1995 | Dosch et al. |
| 5,795,553 A | * | 8/1998 | Lott et al. ................ 423/213.2 |
| 5,830,421 A | * | 11/1998 | Gardner et al. .......... 423/213.2 |
| 6,165,934 A | | 12/2000 | Gardner et al. |

OTHER PUBLICATIONS

Kijlstra, et al., "Deactivation by $SO_2$ of $MnO_x/Al_2O_3$ catalysts used for the selective catalytic reduction of NO with $NH_3$ at low temperatures," Applied Catalysis B: Environmental 16 (1998) 327–337.

Gardner, et al., "Ammonia/Urea Selective Catalytic Reduction (SCR) for Mobile Diesel Engines: Influence of Exhaust Parameters," SAE Technical Paper Series, 2002, 2002–01–1880.

Busca, et al., "Chemical and mechanistic aspects of the selective catalytic reduction of $NO_x$ by ammonia, over oxide catalysts: A review," Applied Catalysis B: Environmental 18 (1998) 1–36.

Smirniotis, et al., "Low–Temperature Selective Catalytic Reduction (SCR) of NO with $NH_3$ by Using Mn, Cr, and Cu Oxides Supported on Hombikat $TiO_2$", Angew. Chem. Int. Ed. 2001, 40, No. 13.

Singoredjo, et al. "Alumina supported manganese oxides for the low–temperature selective catalytic reduction of nitric oxide with ammonia," Applied Catalysis B: Environmental, 1 (1992) 297–316.

* cited by examiner

*Primary Examiner*—Steven Bos
*Assistant Examiner*—Jonas N. Strickland
(74) *Attorney, Agent, or Firm*—Elmer A. Klavetter

(57) ABSTRACT

A method for catalytically reducing nitrogen oxide compounds ($NO_x$, defined as nitric oxide, NO, +nitrogen dioxide, $NO_2$) in a gas by a material comprising a base metal consisting essentially of CuO and Mn, and oxides of Mn, on an activated metal hydrous metal oxide support, such as HMO:Si. A promoter, such as tungsten oxide or molybdenum oxide, can be added and has been shown to increase conversion efficiency. This method provides good conversion of $NO_x$ to $N_2$, good selectivity, good durability, resistance to $SO_2$ aging and low toxicity compared with methods utilizing vanadia-based catalysts.

17 Claims, 17 Drawing Sheets

METHOD FOR SELECTIVE CATALYTIC REDUCTION OF NITROGEN OXIDES

This invention was made with Government support under Contract No. DE-AC04-94AL85000 awarded by the Department of Energy. The Government has certain rights in the invention.

BACKGROUND OF THE INVENTION

The invention relates to a method for selective catalytic reduction of nitrogen oxides and, more particularly, to a method for selective catalytic reduction of nitrogen oxides using catalysts on a hydrous titanium oxide support.

Certain compounds in the exhaust stream of a combustion process, such as the exhaust stream from an internal combustion engine, are undesirable in that they must be controlled in order to meet government emissions regulations. Among the regulated compounds are nitrogen oxide compounds ($NO_x$), hydrocarbons, and carbon monoxide. There are a wide variety of combustion processes producing these emissions, for instance, coal- or oil-fired furnaces, reciprocating internal combustion engines (including gasoline and diesel engines), and gas turbine engines. In each of these combustion processes, control measures to prevent or diminish atmospheric emissions of $NO_x$, hydrocarbons, and carbon monoxide are needed.

Industry has devoted considerable effort to reducing regulated emissions from the exhaust streams of combustion processes. In particular, it is now usual in the industry to place a catalytic converter in the exhaust system of gasoline engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metal impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be precoated with γ-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a gasoline engine is operating under stoichiometric conditions or nearly stoichiometric conditions with respect to the fuel:air ratio gust enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system. The stoichiometric conditions or nearly stoichiometric conditions will be referred to as non-oxidizing conditions or as producing a non-oxidizing atmosphere.

However, it is desirable to operate the engine at times under lean burn conditions, with excess air, in order to improve fuel economy. While conventional non-oxidizing engine conditions might have a fuel:air ratio having 0.1–0.3% excess oxygen, a lean burn engine has a substantially greater excess of oxygen, from about 1% to perhaps up to 10% excess oxygen relative to the amount of fuel. Under lean burn conditions, conventional catalytic devices are not very effective for treating the $NO_x$ in the resulting oxygen-rich exhaust stream. Lean burn conditions will be referred to as oxidizing conditions or as producing an oxidizing atmosphere.

The exhaust stream from a diesel engine also has a substantial oxygen content, from perhaps about 2–18% oxygen. It is also believed that other combustion processes result in emissions of $NO_x$, hydrocarbons, and carbon monoxide that are difficult or expensive to control because of an oxidizing effluent stream or poor conversion of the compounds using conventional means.

In spite of efforts over the last decade to develop a catalytic converter effective for reducing $NO_x$ to nitrogen under oxidizing conditions in a gasoline engine or in a diesel engine, the need for improved conversion effectiveness has remained unsatisfied. The materials developed prior to the present invention have exhibited unacceptably low efficiencies for reduction of $NO_x$ in an oxidizing exhaust stream, even with such high levels of expensive noble metal catalysts as to make them impractical for use by the automotive industry. Moreover, there is a continuing need for improved effectiveness in treating $NO_x$, hydrocarbons, and carbon monoxide emissions from any combustion process.

The industry has also been concerned with the related problem of the temperatures at which catalytic converter devices are effective for reducing nitrogen oxides and other emissions. Typically, $NO_x$ reduction catalysts are evaluated by the maximum $NO_x$ conversion of the catalyst and the temperature at which that maximum occurs. Automotive exhaust catalysts are expected to to perform over a wide range of operating temperatures encompassing cold start (i.e., start when the engine is at ambient temperature) to wide-open throttle conditions. For this reason, a catalyst having a higher peak $NO_x$ reduction performance occurring at one certain temperature may not decrease $NO_x$ emissions as much during the whole period of engine operation as a catalyst having a lower peak $NO_x$ reduction performance but having a wider temperature window over which it has high $NO_x$ reduction activity. Another consideration is the temperature required for a particular catalyst to have any appreciable activity. The standard "three-way" catalyst system is ineffective for treating emissions until a temperature of approximately 250° C., the light-off temperature of the catalyst system, is reached. This threshold temperature for effective operation of the catalytic converter is often referred to as the "light-off" temperature. It would be desirable to reduce the light-off temperature as much as possible because significant amounts of emissions are produced from the time when the engine is started until the catalytic converter is finally heated to the light-off temperature. In addition, diesel engines and engines that are run under lean burn (oxidizing) conditions have lower average exhaust temperatures, usually in the range of about 150 to 350° C. The conventional three-way catalytic converter systems reach maximum efficiency at temperatures between 400 and 800° C., above the operating temperature ranges of these engines.

The selective catalytic reduction of nitrogen oxides ($NO_x$, defined as nitric oxide, NO, +nitrogen dioxide, $NO_2$) by urea/ammonia has been identified as a promising technology to enable lean-burn gasoline and diesel engines to meet U.S. EPA Tier 2 emissions standards. Titania-supported vanadia catalyst formulations, generally containing promoter phases such as tungsten oxide or molybdenum oxide, are the current industrial standard for ammonia selective catalytic reduction (SCR) of NO applications involving stationary source (power plant) emissions. These steady state applications are very different from automotive exhaust aftertreatment applications, which are highly transient in nature. Considerable work has been performed recently in an attempt to adapt this technology for mobile source applications. Vanadia-based catalysts, although possessing many positive attributes, such as high activity, selectivity, durability, and resistance to $SO_2$ aging, also possess negative attributes related to potential toxicity and volatility issues associated with catalyst manufacture and potential use in exhaust aftertreatment applications.

Useful would be a method for the selective catalytic reduction of nitrogen oxide compounds with a catalytic material having high activity, selectivity and durability that has less toxicity than vanadia-based catalysts.

DETAILED DESCRIPTION OF THE INVENTION

Figure 1:
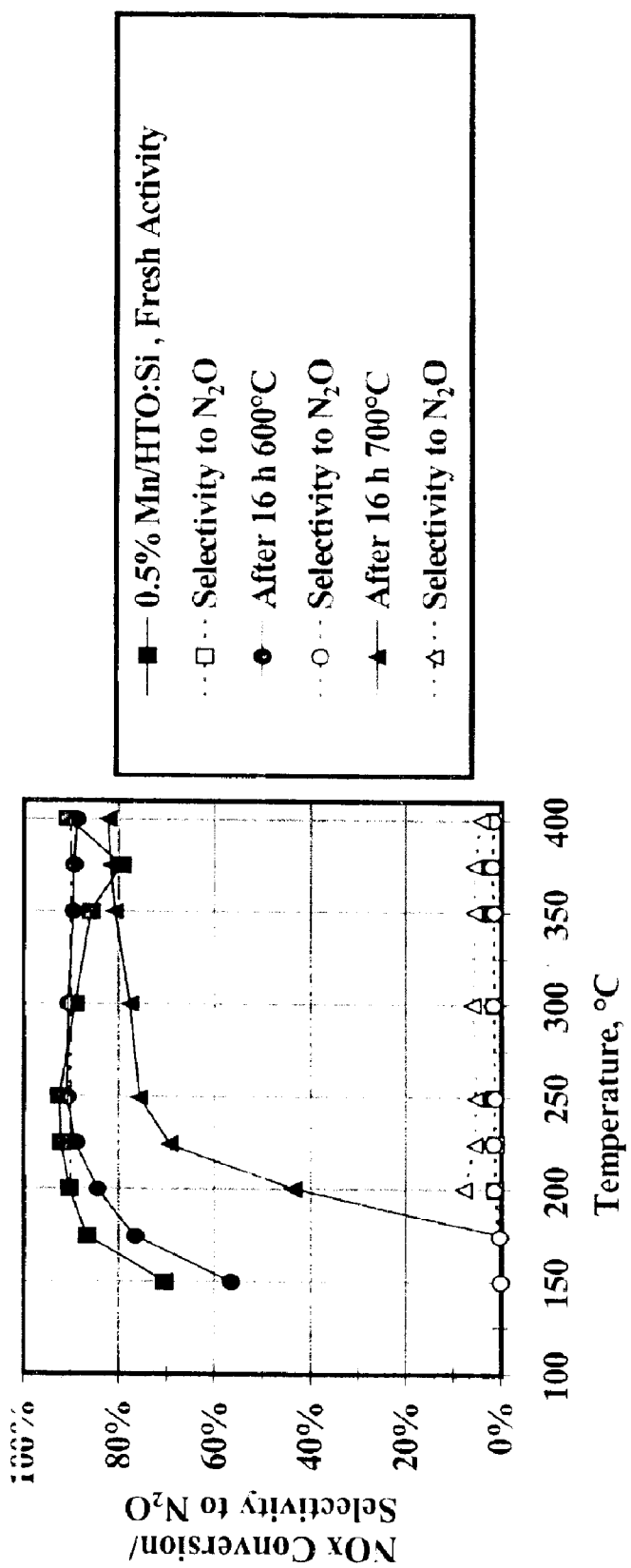
FIG. 1 illustrates $NO_x$ conversion and $N_2O$ selectivity profiles for Mn/HTO:Si catalyst in powder form.

In the method of the present invention, nitrogen oxide compounds ($NO_x$, defined as nitric oxide, NO, +nitrogen dioxide, $NO_2$) in a gas are catalytically reduced by a material comprising a base metal consisting essentially of CuO and Mn, and oxides of Mn, on an activated metal hydrous metal oxide support. Additionally, the addition of a promoter, such as tungsten oxide or molybdenum oxide, has been shown to increase conversion efficiency. This method provides good conversion of $NO_x$ to $N_2$, good selectivity, good durability, resistance to $SO_2$ aging and low toxicity compared with methods utilizing vanadia-based catalysts.

Applications utilizing this method include the reduction of $NO_x$ for furnaces, internal combustion engines and gas turbine engines. The gas containing the NOX can be at temperatures varying between approximately 100–750° C. with concentrations of $NO_x$ generally in the range of 100–400 parts per million (ppm) for internal combustion engine gas streams and more generally less than approximately 1000 ppm. Other gas components generally include other hydrocarbon compounds, sulfur oxides ($SO_x$), water vapor, oxygen, carbon dioxide, carbon monoxide and hydrogen. Prior to contact of the gas with the catalytic base metal material, urea or ammonia is added as a fluid to the gas. If ammonia is added, the ammonia is added in an approximately 1:1 ratio with the $NO_x$ concentration. If urea is added, the urea is added in an approximate ratio of 1 mole urea to 2 moles $NO_x$ as one mole of urea thermally decomposes at elevated temperatures in the gas to yield two moles ammonia.

For applications involving reduction of $NO_x$ emissions from internal combustion engine exhaust, it is desirable to have a $NO_x$ conversion to $N_2$ or approximately greater than 90% over a temperature range of 200 to 400° C. Therefore, in the SCR method of the present invention, different base metals (the active phase) on various oxide supports were considered, including aluminum oxide (γ—$Al_2O_3$), titanium oxide ($TiO_2$), and activated metal hydrous metal oxide supports. Testing showed that catalysts comprising base metal phases CuO and Mn (and oxides of Mn, referred hereinto as $MnO_x$) on hydrous metal oxide (HMO), with or without the addition of a promoter component met the stated criteria and that the catalytic reduction of nitrogen oxides using catalysts on the HMO supports was significantly more effective than the catalytic reduction of nitrogen oxides using catalysts on the γ—$Al_2O_3$ and $TiO_2$ supports.

The active phase of Mn on the catalyst can be Mn or an oxided form of Mn such as MnO, $MnO_2$, $MnO_{1.5}$ and other oxides. Promoter phases that can be added to the catalyst include $WO_3$ and $MoO_3$. The promoter is generally at a concentration less than approximately 5% by weight of the catalyst. Active and promoter phase additions to the hydrous metal oxide supported catalysts were made using a combination of ion exchange and incipient wetness impregnation techniques while conventional oxide-supported catalysts were prepared using only incipient wetness impregnation techniques. The HMO-supported catalyst can be applied to a ceramic substrate such as beads, pellets, or a monolith. When used, beads are usually porous, ceramic spheres having the catalyst metal impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be precoated with γ-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

In the method of the present invention, the active metal phase is supported by an activated hydrous metal oxide material. In general, the activated hydrous metal oxide material, such as a hydrous titanium oxide or hydrous zirconium oxide, is prepared through a first step of forming an intermediate sol in a lower alcohol by the reaction of an alkali or alkaline earth metal hydroxide dissolved in the lower alcohol with a transition metal alkoxide. The alcohol used preferably has up to 8 carbon atoms, more preferably up to 4 carbon atoms, and it is particularly preferred to use methanol. The intermediate is then hydrolyzed to form a hydrous metal oxide containing the alkali or alkaline earth metal cation. An ion exchange of the hydrous metal oxide with the doping metal or metals follows, and, finally, the doped material is calcined to activate the metal-doped hydrous metal oxide material. General preparative procedures for catalytic hydrous metal oxide materials are described in Dosch et al., U.S. Pat. No. 4,511,455, Dosch et al., U.S. Pat. No. 4,929,582, Dosch et al, U.S. Pat. No. 5,461,022, and Gardner et al., U.S. Pat. No. 6,165,934, the entire contents of all patents now being incorporated herein by reference.

One useful HMO material includes the use of silicates, such as tetraalkylorthosilicates, including tetramethylorthosilicate and tetraethylorthosilicate, in the synthesis of the HMO materials, When the metal-doped hydrous HMO material includes silica, the material has greater thermal stability, being stable at temperatures up to 1000° C. The silicate is mixed with the transition metal alkoxide prior to the reaction with the alkali or alkaline earth metal hydroxide. It is believed that the presence of silica inhibits metal oxide particle growth and high temperature crystallization to prevent loss of surface area. This can be beneficial when the device is used for treating the exhaust stream from an automotive engine because of possible temperature spikes under certain conditions, such as an engine misfire, at which times temperatures can rise as high as 1000° C. When silica is included to form the HMO material, designated as HMO:Si, it can be included in a molar ratio of transition metal, such as titanium or zirconium, to silicon of from about 4:1 to about 6:1. If the transition metal used is titanium, the designation of the hydrous metal oxide is HTO:Si. The tetraalkylorthosilicate is mixed with the transition metal alkoxide, alcohol, and hydroxide to produce a co-network with silicon-oxygen; transition metal-oxygen, and silicon-oxygen-transition metal bonds.

The activated metal-doped hydrous metal oxide material, can be introduced onto a substrate, such as ceramic beads or a cordierite monolith optionally precoated with γ-alumina, by one of at least two methods. In the first method, hereinafter referred to as the powder slurry method, an aqueous slurry is made of an activated noble metal-doped hydrous metal oxide powder, and is contacted with the target substrate. The first method has the advantage of having the same steps for the manufacturer of ceramic substrates for automotive catalytic converters as methods already used in the industry.

Catalysts were evaluated for use in the method of the present invention by using simulated exhaust gas compositions containing nitrogen oxides and other compounds characteristic of exhaust gases. The simulated exhaust gas compositions were exposed to catalysts, both with and without promoters, at varied temperatures for varied times and with varied gas component concentrations. Catalysts using HMO supports were prepared and the performance in reducing nitrogen oxides compared with catalysts prepared with the aluminum oxide and titanium oxide supports. In particular, the performance of the catalysts in reducing $NO_x$ in a gas stream were evaluated for fresh, hydrothermally-aged and $SO_2$-aged states of the catalysts, with a goal of greater than 90% conversion to nitrogen over a temperature range from 200 to 400° C. The gas stream evaluated included 14% $O_2$, 5% $CO_2$, 4.6% $H_2O$, 0–20 ppm $SO_2$, 0–350 ppm $NH_3$, 175 ppm NO, and 175 ppm $NO_2$ at a space velocity of 30,000 $cm^3/cm^3/h$ at temperatures ranging from 110–400° C.

FIG. 1 shows the fresh catalyst activity and short-term durability performance of an unpromoted Mn/HTO:Si catalyst in powder form. This catalyst possesses good fresh activity with no significant $NO_x$ adsorption. Although the fresh catalyst activity and 600° C. hydrothermal aging results are very close to the acceptance criteria (set at greater than 90% $NO_x$ conversion between 200 and 400° C., see dotted line in FIG. 1 used as a reference), significant deactivation occurred for this catalyst during hydrothermal aging at 700° C. Although not shown herein, the short-term durability performance of this catalyst was significantly better than that of an unpromoted Mn/conventional $TiO_2$ (the $TiO_2$ material was the product Sachtleben Hombikat, provided by Sachtleben Chemie BmbH, Duisburg, Germany) catalyst, which showed significantly more deactivation after 600° C. hydrothermal aging. The direct comparison of the HTO:Si-supported Mn catalysts to Mn supported on commercial $TiO_2$ demonstrates specific short-term durability advantages for the catalysts utilizing HMO supports.

Figure 2:
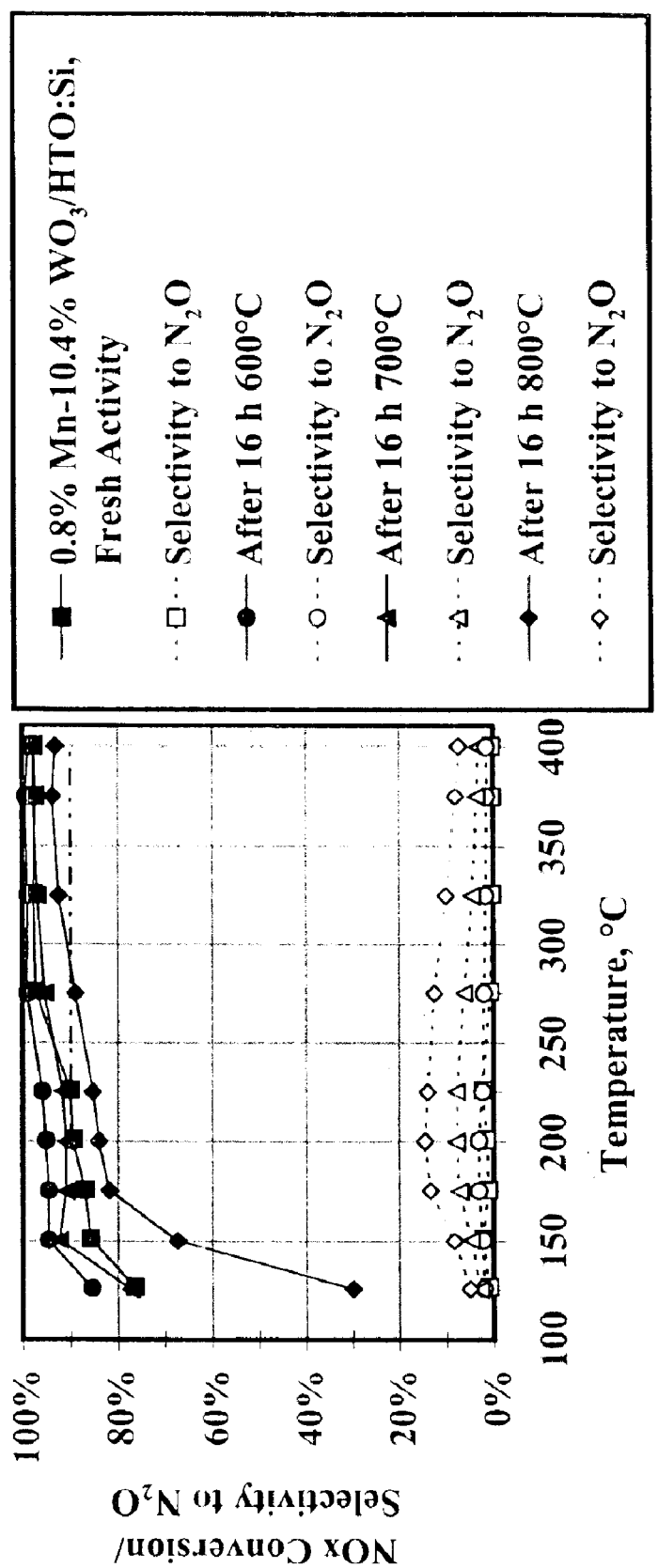
FIG. 2 illustrates $NO_x$ conversion and $N_2O$ selectivity profiles for Mn—$WO_3$/HTO:Si catalyst in powder form at 600, 700 and 800° C.

The effect of the $WO_3$ promoter phase on improving fresh catalyst activity and short-term durability performance is shown in FIG. 2. In addition to improving fresh catalyst activity (particularly at low temperature, as seen when comparing FIG. 1 to FIG. 2), the promoter phase significantly improves the resistance to catalyst deactivation during hydrothermal aging for Mn/HTO:Si. Note that the results for Mn—$WO_3$/HTO:Si after 800° C. hydrothermal aging are superior to those of Mn/HTO:Si after 700° C. aging (see FIG. 1). A slight increase in $N_2O$ selectivity is observed with increasing hydrothermal aging temperature, possibly consistent with sintering of the active phase component of the Mn/HTO:Si formulation.

Figure 3:
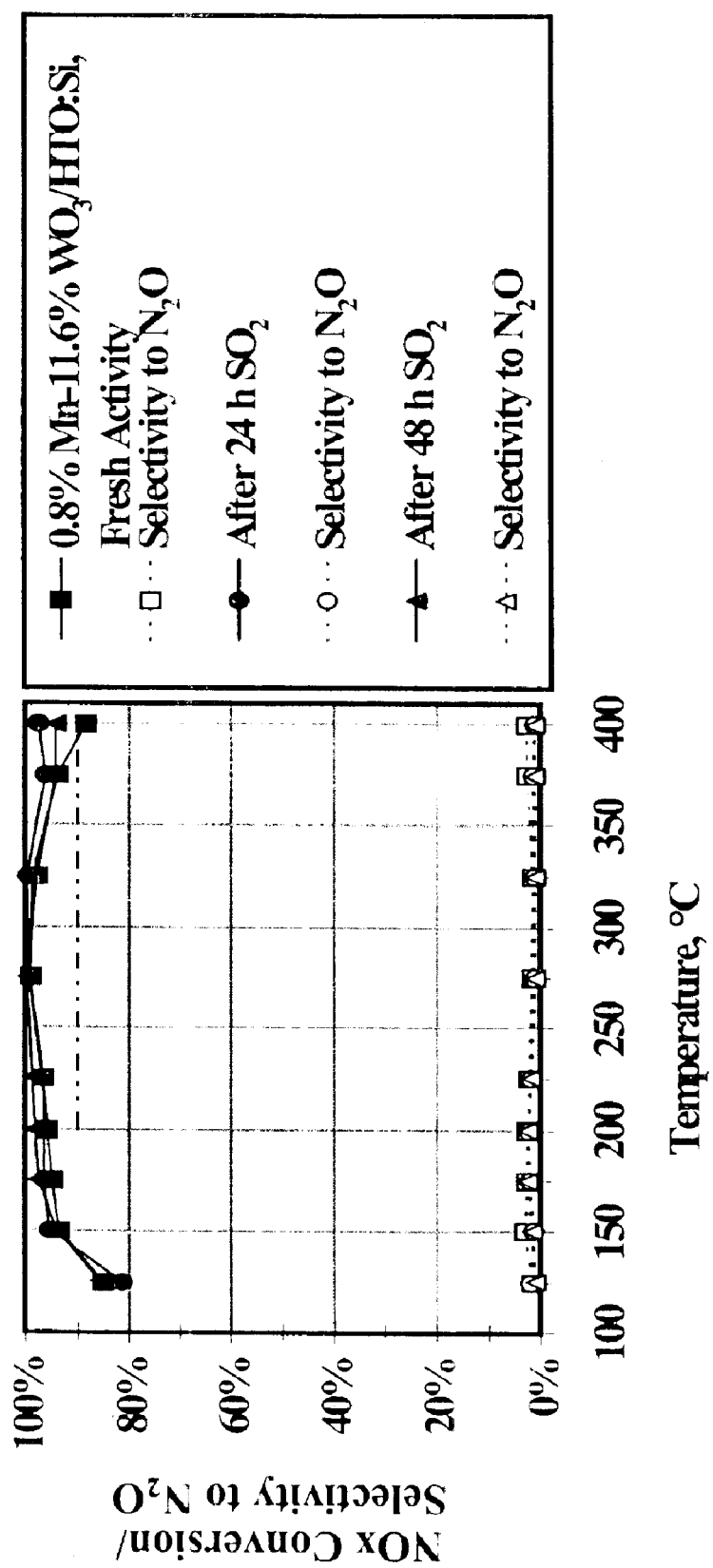
FIG. 3 illustrates $NO_x$ conversion and $N_2O$ selectivity profiles for Mn—$WO_3$/HTO:Si catalyst in powder form at 350° C. for 24 and 48 h.

FIG. 3 shows that the Mn—$WO_3$/HTO:Si catalyst shows no significant deactivation after 48 h of $SO_2$ aging at 350° C. The high level of catalyst activity over a wide temperature range demonstrates, along with the short-term durability data shown in FIG. 2, acceptable performance of this catalyst formulation.

Figure 4:
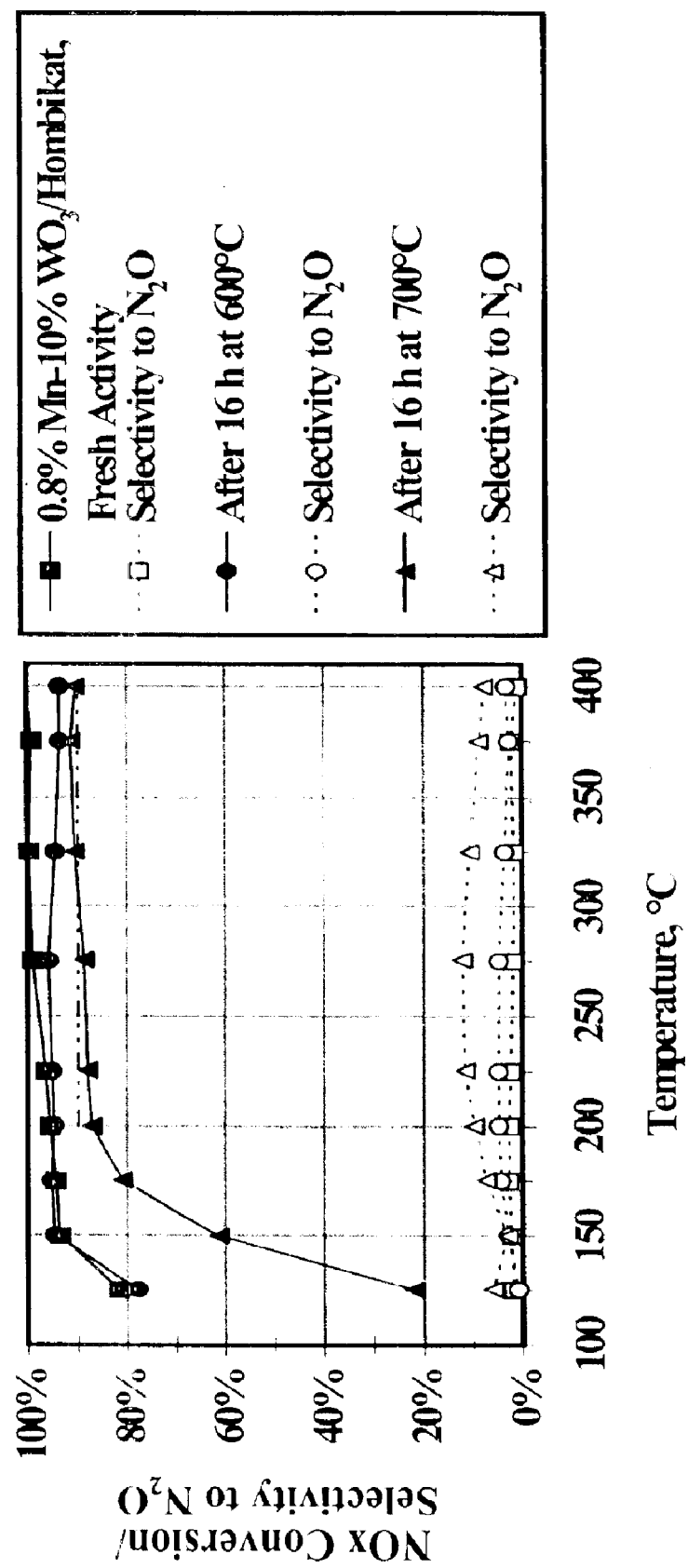
FIG. 4 illustrates $NO_x$ conversion and $N_2O$ selectivity profiles for Mn—$WO_3$/$TiO_2$ in powder form at 600 and 700° C.

The ion-exchangeable hydrous metal oxide supports used in the method of the present invention demonstrate performance advantages relative to commercial catalyst support materials. For fresh catalysts in powder form, it was found that the SNL HTO:Si support offers distinct advantages with respect to the Mn—$WO_3$ formulation dispersed on several commercial catalyst support materials. FIG. 4 shows fresh catalyst activity and short-term durability results obtained for a Mn—$WO_3$ formulation on a commercial $TiO_2$ (Sachtleben Hombikat). By comparing FIG. 2 with FIG. 4, it is seen that the HTO:Si-supported Mn—$WO_3$ formulation is more resistant to hydrothermal aging than the equivalent $TiO_2$-supported formulation. Specifically, hydrothermal aging of the HTO:Si-supported for Mn—$WO_3$ at 800° C. is nominally equivalent to hydrothermal aging of the $TiO_2$-supported for Mn—$WO_3$ at 700° C. These results are consistent with results for the case of unpromoted Mn formulations supported on HTO:Si versus commercial $TiO_2$.

Figure 5:
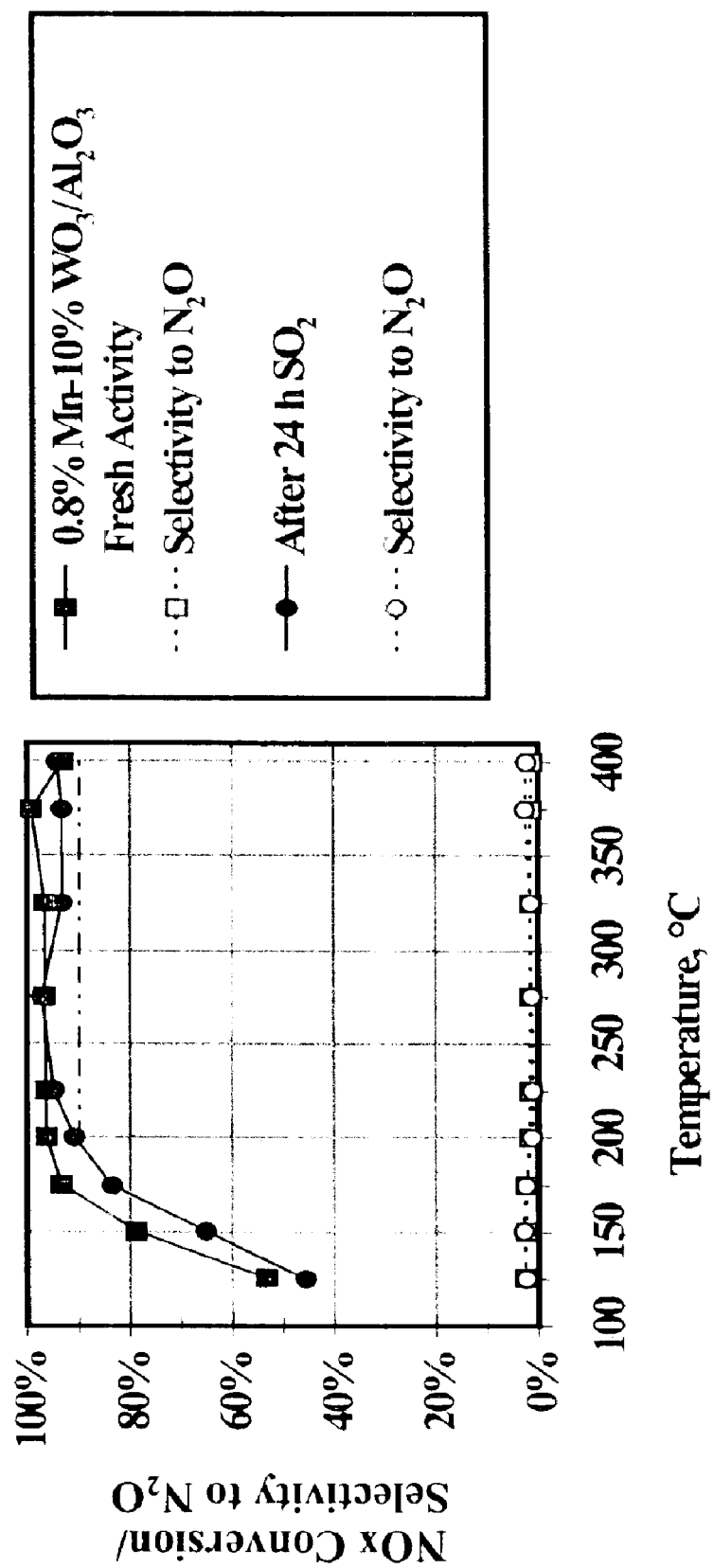
FIG. 5 illustrates $NO_x$ conversion and $N_2O$ selectivity profiles for Mn—$WO_3$/$Al_2O_3$ catalyst in powder form at 350° C. for 24 and 48 h.

A second commercial support material, $Al_2O_3$ (γ-form), was also evaluated with the equivalent Mn—$WO_3$ formulation. In this case, the HTO:Si-supported Mn—$WO_3$ was found to possess both better low temperature activity and improved resistance to $SO_2$ poisoning relative to the $Al_2O_3$-supported material (catalysts in powder form). FIG. 5 shows the fresh catalyst activity of the $Al_2O_3$-supported MN—$WO_3$ relative to the activity obtained after $SO_2$ aging for 24 h. Unlike the Mn—$WO_3$ formulation on the HTO:Si support, which showed no observable deactivation due to $SO_2$ aging over 48 h at 350° C. (see FIG. 3), a slight deactivation was observed after 24 h of $SO_2$ aging at 350° C. for the equivalent catalyst formulation on the $Al_2O_3$ support. Examination of the low temperature portion of the $NO_x$ conversion profiles in FIG. 3 and FIG. 5 clearly shows the superior low temperature performance of the HTO:Si-supported Mn—$WO_3$ material. Only one previous report was found in the literature related to $Al_2O_{31}$-supported MnO—$WO_3$ catalysts used for SCR of NO. This paper showed that the main attribute of the $WO_3$ promoter is to improve selectivity to product $N_2$ (rather than $N_2O$), although this comes at a cost of lower activity (L. Singoredo, R. Korver, F. Kapteijn, and J. Moulijn, Appl. Catal. B, 1992, 1, 297). Singoredo et al., concluded that the role of $WO_3$ was not clearly elucidated for supported Mn catalysts.

Figure 6:
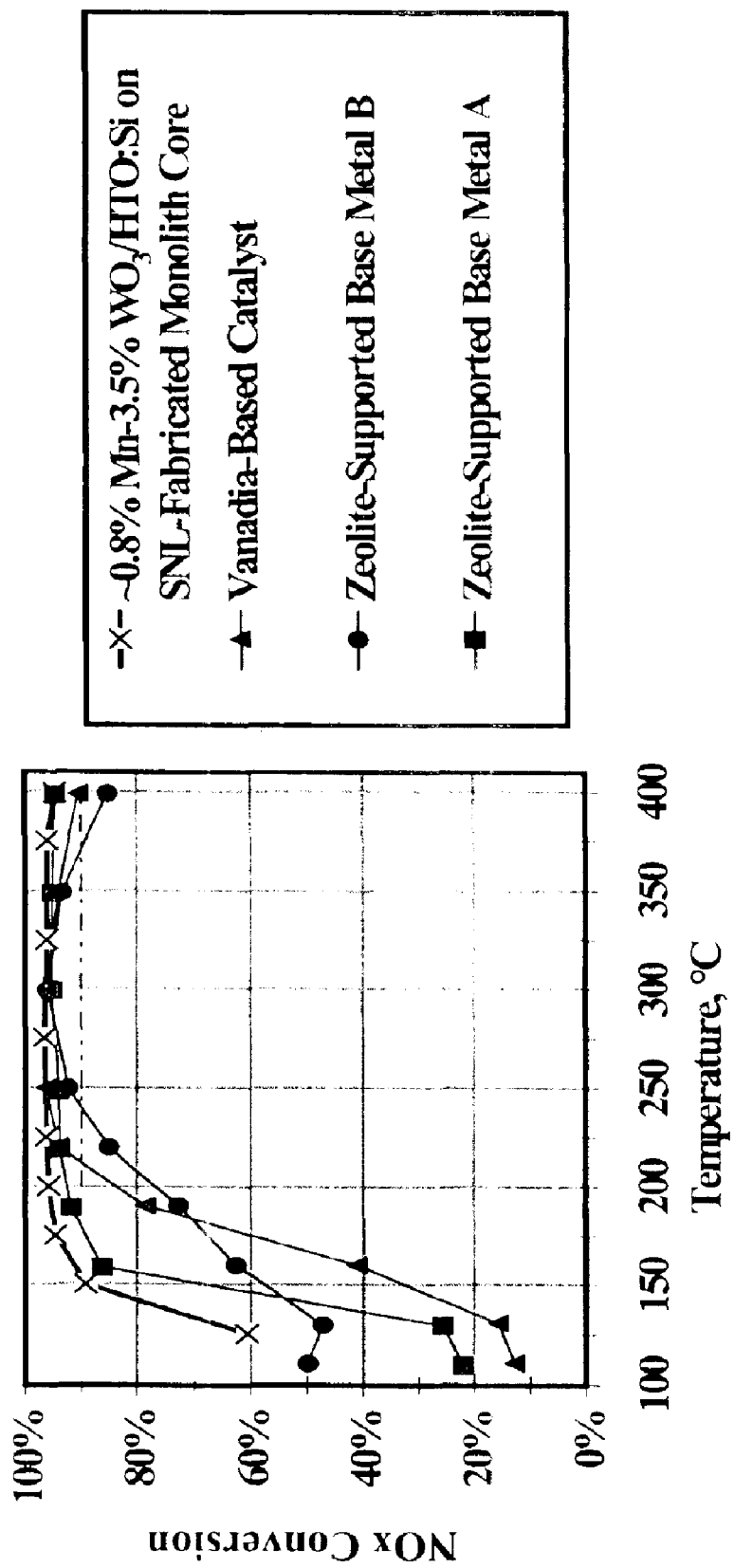
FIG. 6 illustrates $NO_x$ conversion profiles for fresh supplier benchmark catalysts and Mn—$WO_3$/HTO:Si in monolith core form.

The HTO:Si-supported Mn—$WO_3$ formulation were also evaluated in monolith core form using the direct coating method developed as part of previous monolith coating activities. Using the direct coating method, an alumina-coated cordierite monolith core was soaked in the organo-metallic soluble intermediate to provide a precursor to the ion exchangeable silica-doped hydrous titanium oxide (HTO:Si) coating. Following atmospheric hydrolysis of the soluble intermediate coating and drying, the monolith core itself was put through the ion exchange and/or other subsequent processes to add promoter and/or active metal phases. An example of fresh catalyst activity test results for the Mn—$WO_3$/HTO:Si formulation relative to supplier benchmark materials in monolith core form is shown in FIG. 6. All of the catalysts shown in FIG. 6 show good to excellent ammonia SCR activity between 200 and 400° C. The zeolite-supported base metal A catalyst exhibits the best low temperature (less than 200° C.) performance of the supplier benchmark materials. The efforts at producing the HTO:Si-supported Mn—$WO_3$ formulation in monolith core form yielded excellent results. This catalyst has fresh catalyst activity at least as good as the best commercial supplier support material over the entire temperature range of interest. In particular, high ammonia SCR activity in the 150–200° C. range is desirable for both light- and medium-duty exhaust applications. Preliminary hydrothermal and $SO_2$ aging studies show that the Mn—$WO_3$/HTO:Si formulation in monolith core form also passes the staged catalyst acceptance protocol.

Figure 7:
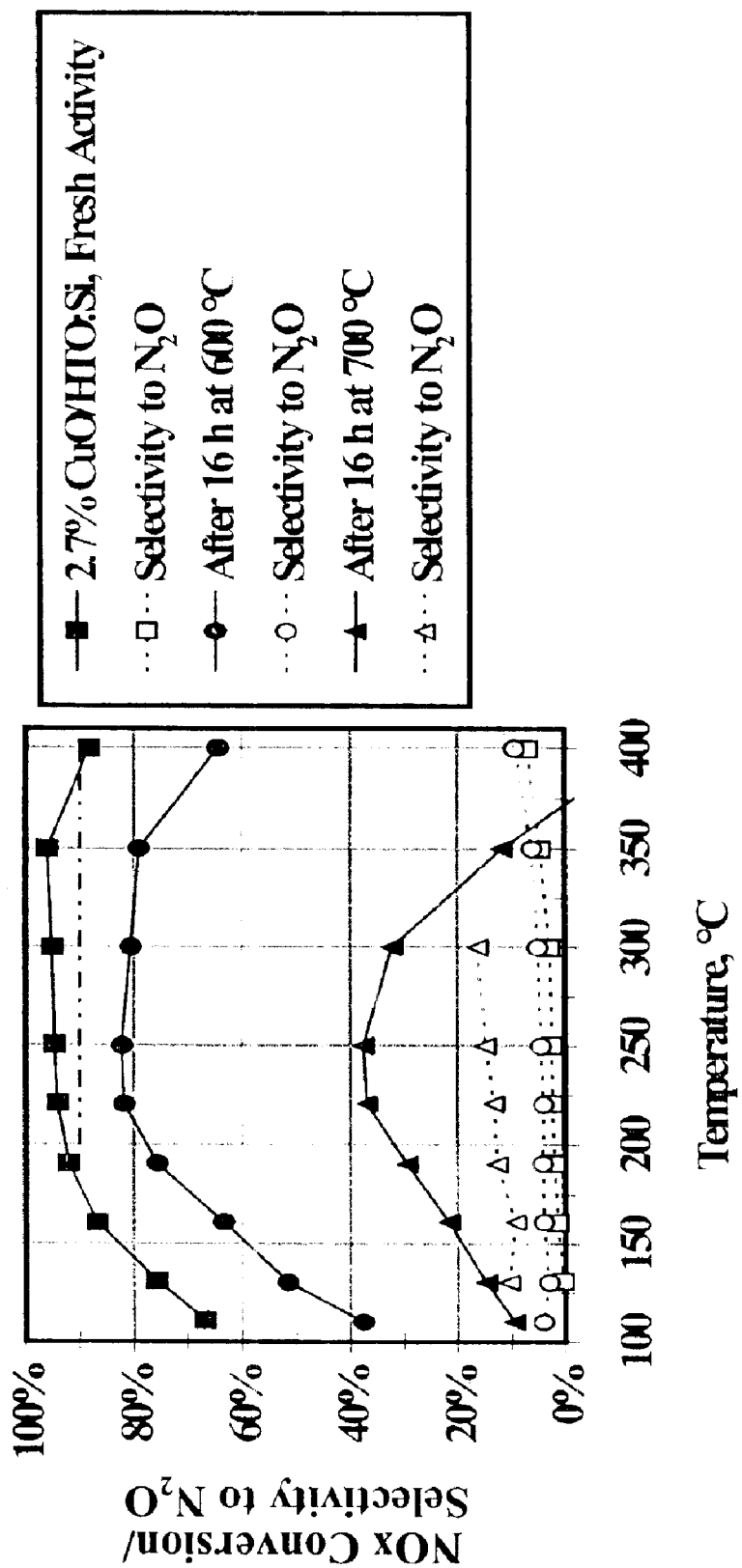
FIG. 7 illustrates $NO_x$ conversion and $N_2O$ selectivity profiles for a CuO/HTO:Si catalyst in powder form at 600 and 700° C.

Similar positive effects of $WO_3$ promotion were observed with other HTO:Si-supported base metal catalysts. FIG. 7 shows the fresh activity and short term durability performance of a HTO:Si-supported CuO catalyst. Although meeting activity requirements in the fresh state, hydrothermal aging at 600° C. for 16 h resulted in a significant decrease in catalyst activity. Further hydrothermal aging at 700° C. resulted in a severe decrease in catalyst performance. Overall hydrothermal aging performance for this material was significantly worse than the Mn/HTO:Si catalyst shown in FIG. 1.

Figure 8:
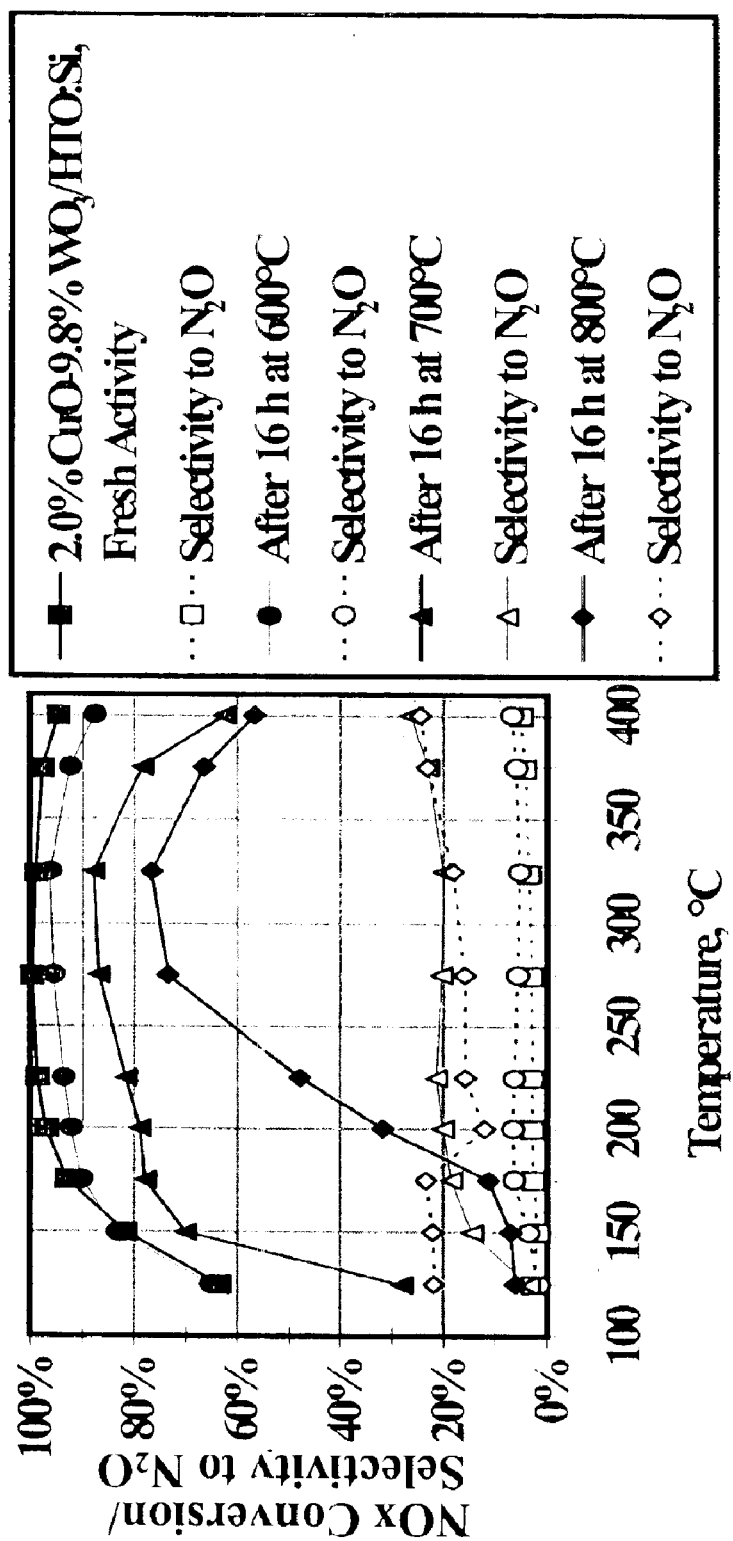
FIG. 8 illustrates $NO_x$ conversion and $N_2O$ selectivity profiles for a CuO—$WO_3$/HTO:Si catalyst in powder form at 600, 700, and 800° C.

Similar to the results obtained for the Mn/HTO:Si catalyst system, the addition of a $WO_3$ promoter phase to the CuO/HTO:Si catalyst formulation resulted in a significant positive effect with respect to fresh catalyst activity, short-term durability, and $SO_2$ aging. A specific example of the positive effect of the $WO_3$ promoter is shown in FIG. 8. In contrast to the CuO/HTO:Si catalyst, the CuO—$WO_3$/HTO:Si catalyst passed short-term durability requirements after 600° C. hydrotherrmal aging. Although significant catalyst deactivation was observed upon further catalyst hydrothermal aging at 700 and 800° C., the performance of this formulation relative to the unpromoted formulation (see FIG. 7) was significantly improved. Although showing a slight sensitivity to $SO_2$ aging, the CuO—$WO_3$/HTO:Si catalyst also passed the $SO_2$ aging criterion, demonstrating that this catalyst formulation demonstrated acceptable characteristics for SCR of nitrogen oxides.

Figure 9:
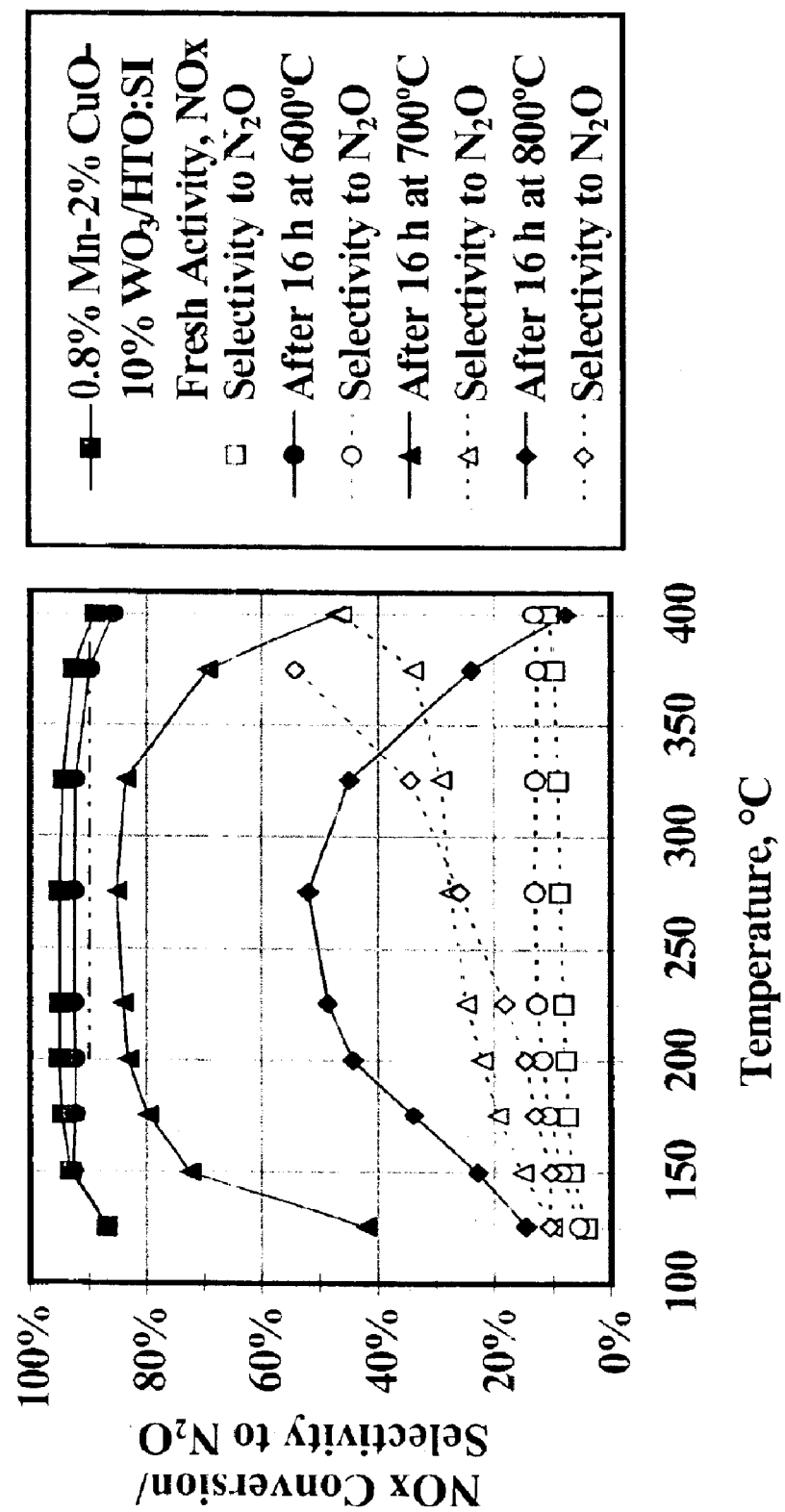
FIG. 9 illustrates $NO_x$ conversion and $N_2O$ selectivity profiles for a Mn—CuO—$WO_3$/HTO:Si catalyst in powder form at 600, 700, and 800° C.
Figure 10:
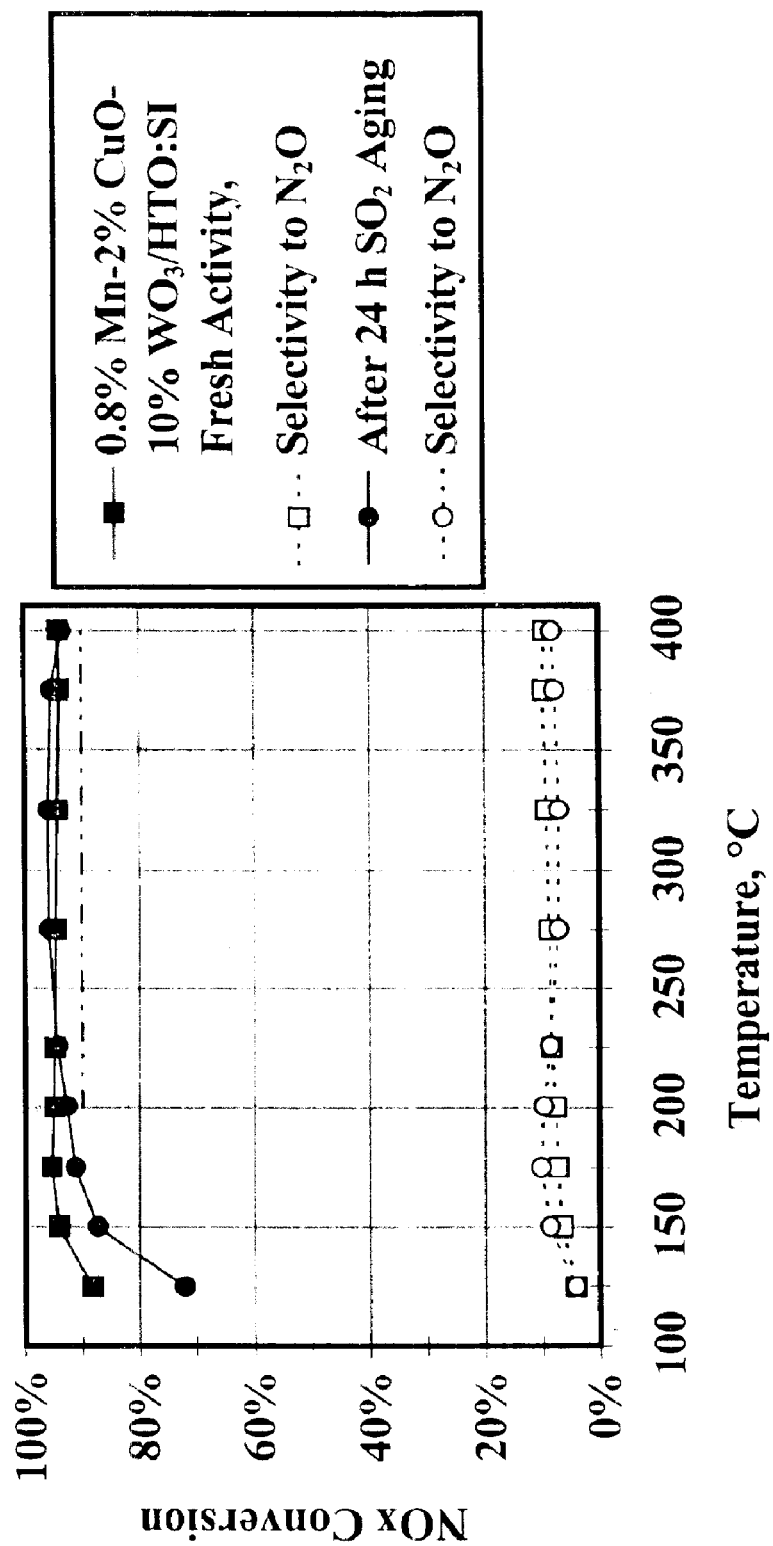
FIG. 10 illustrates $NO_x$ conversion and $N_2O$ selectivity profiles for Mn—CuO—$WO_3$/HTO:Si catalyst in powder form at 350° C. for 24 h.

An additional group of catalysts were developed that contained Mn and CuO as well as the $WO_3$ promoter. As shown in FIG. 9 and FIG. 10, these catalysts also passed the fresh activity, short-term hydrothermal aging and $SO_2$ aging criteria. These catalysts behaved similarly to Mn—$WO_3$/HTO:Si, although they showed slightly more deactivation after $SO_2$ aging (FIG. 9 compared to FIG. 3).

Figure 11:
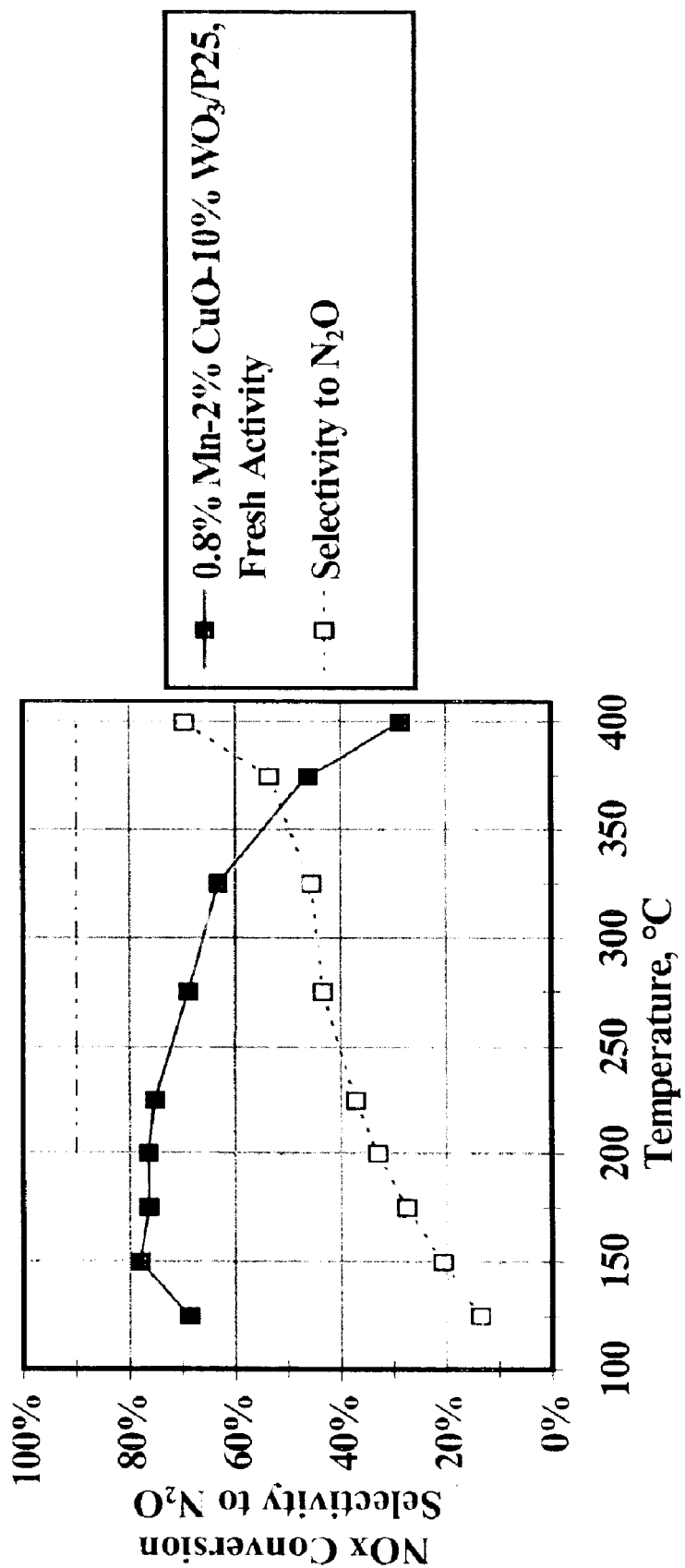
FIG. 11 illustrates $NO_x$ conversion and $N_2O$ selectivity profiles for Mn—CuO—$WO_3$/$TiO_2$ catalyst in powder form in its fresh state.

A Mn—CuO—$WO_3$ catalyst was also made on a commercially available $TiO_2$ support, Degussa P25. This catalyst demonstrated much lower $NO_x$ activity and selectivity to $N_2$ than the HTO:Si supported material (FIG. 11) once again confirming advantages of catalyst performance in SCR of nitrogen oxides using the HTO:Si material.

Three catalyst formulations, Mn—$WO_3$/HTO:Si, CuO—$WO_3$/HTO:Si, and Mn—CuO—$WO_3$/HTO:Si, were tested under a variety of $NO:NO_2$ ratios. In these tests, the total amount of $NO+NO_2$ remained constant at 350 ppm, but the relative amounts of NO and $NO_2$ were varied.

Figure 12:
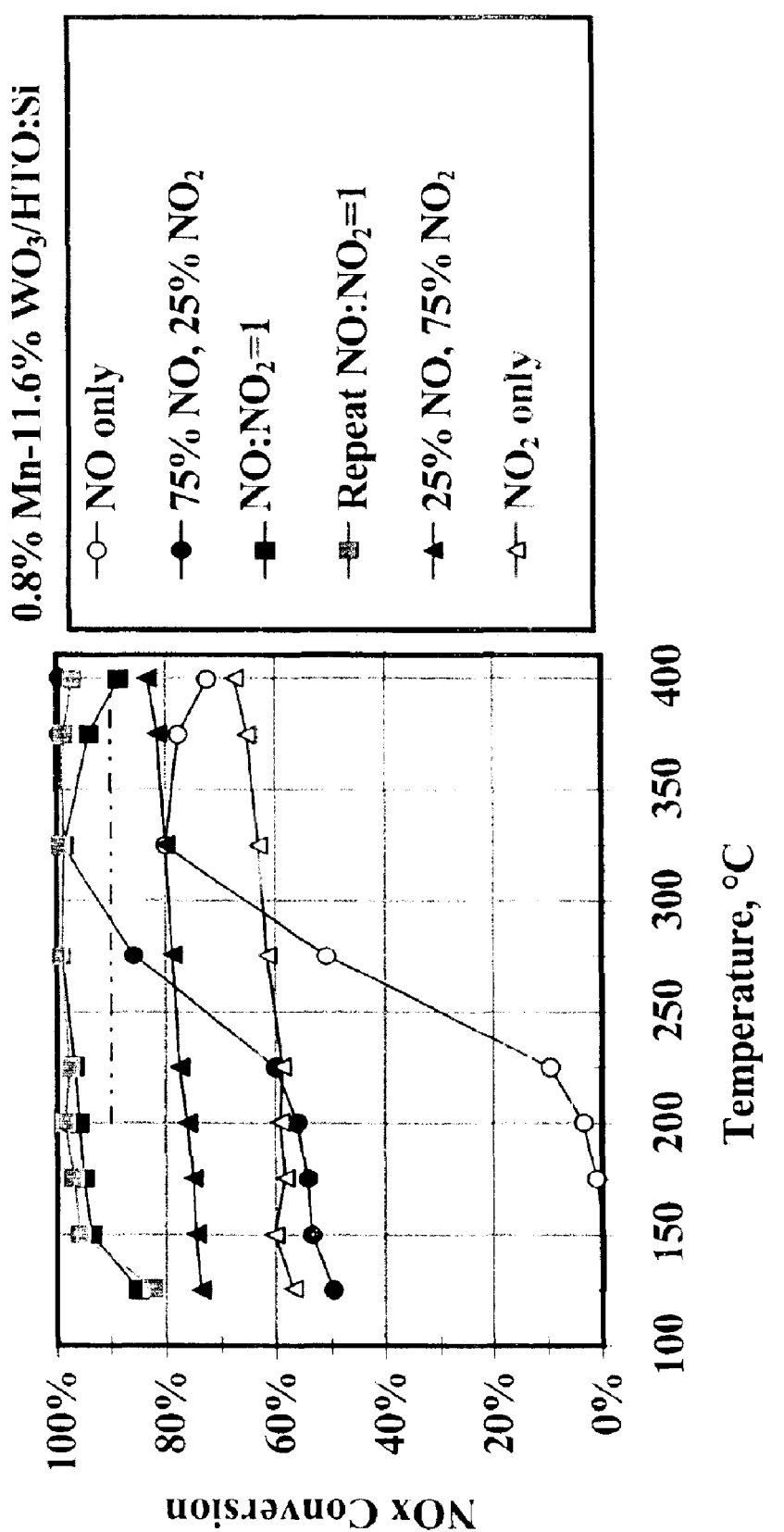
FIG. 12 illustrates $NO_x$ conversion profiles for for Mn—$WO_3$/HTO:Si catalyst in powder form for different $NO:NO_2$ ratios.
Figure 13:
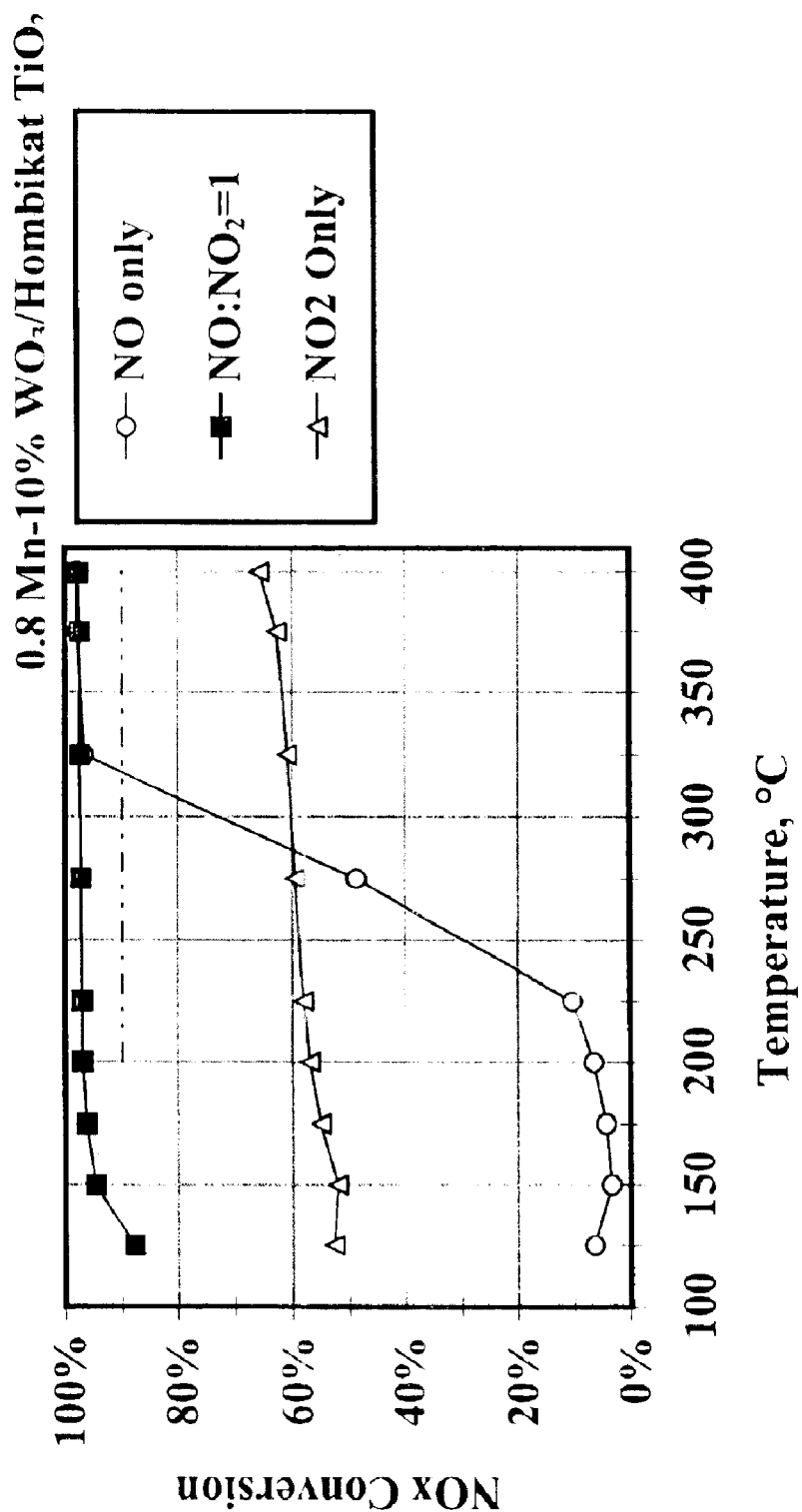
FIG. 13 illustrates $NO_x$ conversion profiles for Mn—$WO_3$/$TiO_2$ in powder form for different $NO:NO_2$ ratios.

As shown in FIG. 12, Mn—$WO_3$/HTO:Si catalysts show significant dependence on the $NO:NO_2$ ratio. As expected, the best results were achieved with $NO:NO_2=1$ and activity falls off with deviations from this optimal value. When all the $NO_x$ is present as NO, there is no significant conversion below approximately 200° C. $MnO_x$—$WO_3$ on a commercial $TiO_2$ (Sachtleben Hombikat) support shows similar results as on the HTO:Si support (FIG. 13).

Figure 14:
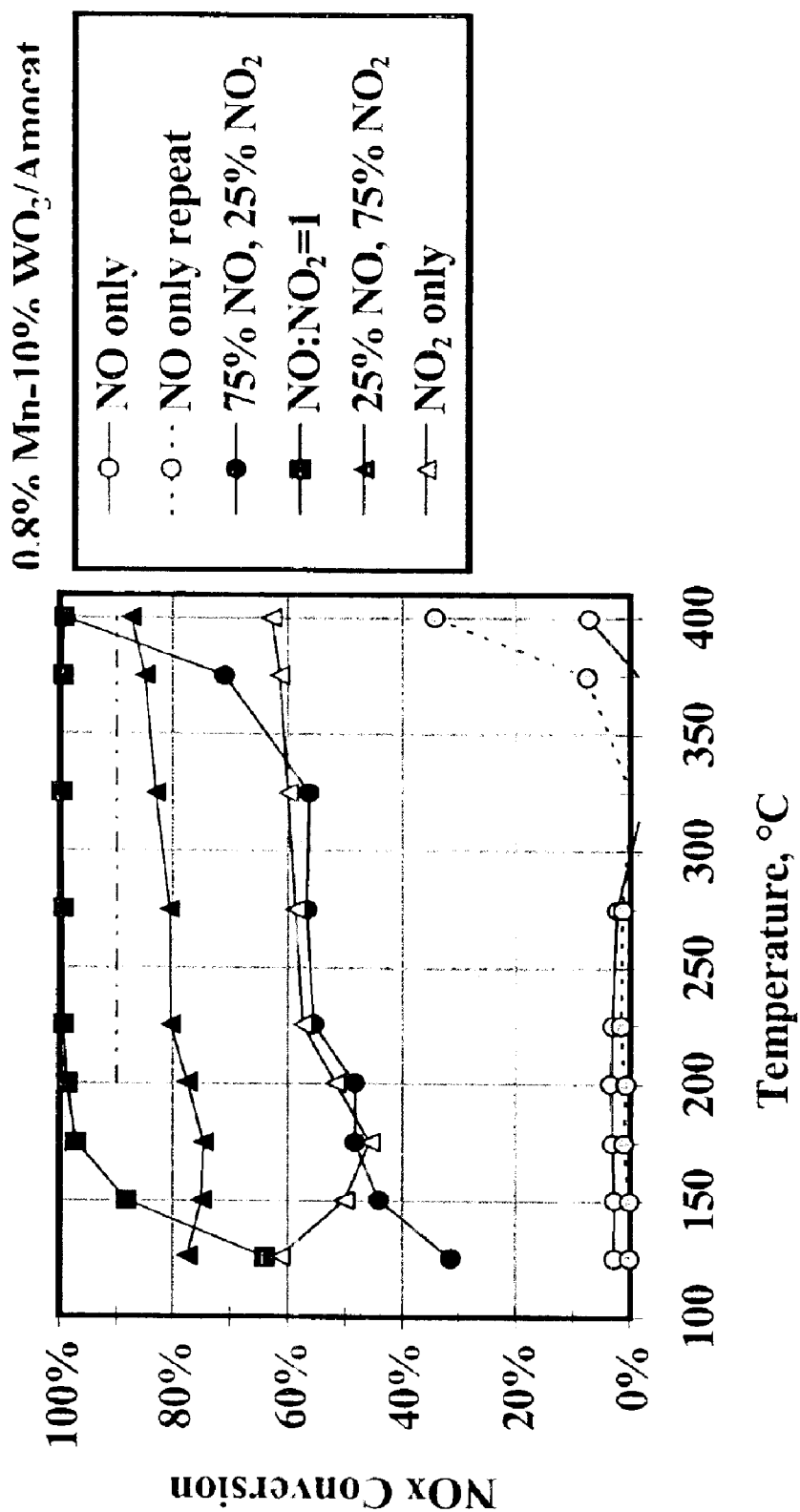
FIG. 14 illustrates $NO_x$ conversion profiles for Mn—$WO_3$/Alumina in powder form for different $NO:NO_2$ ratios.

When the $NO:NO_2$ ratio was varied over a Mn—$WO_3$ catalyst on a conventional alumina support, the performance effect was even more is pronounced than on the other supports, as shown in FIG. 14. In fact, in the NO only case, there is almost no activity at temperatures below 400° C.

Figure 15:
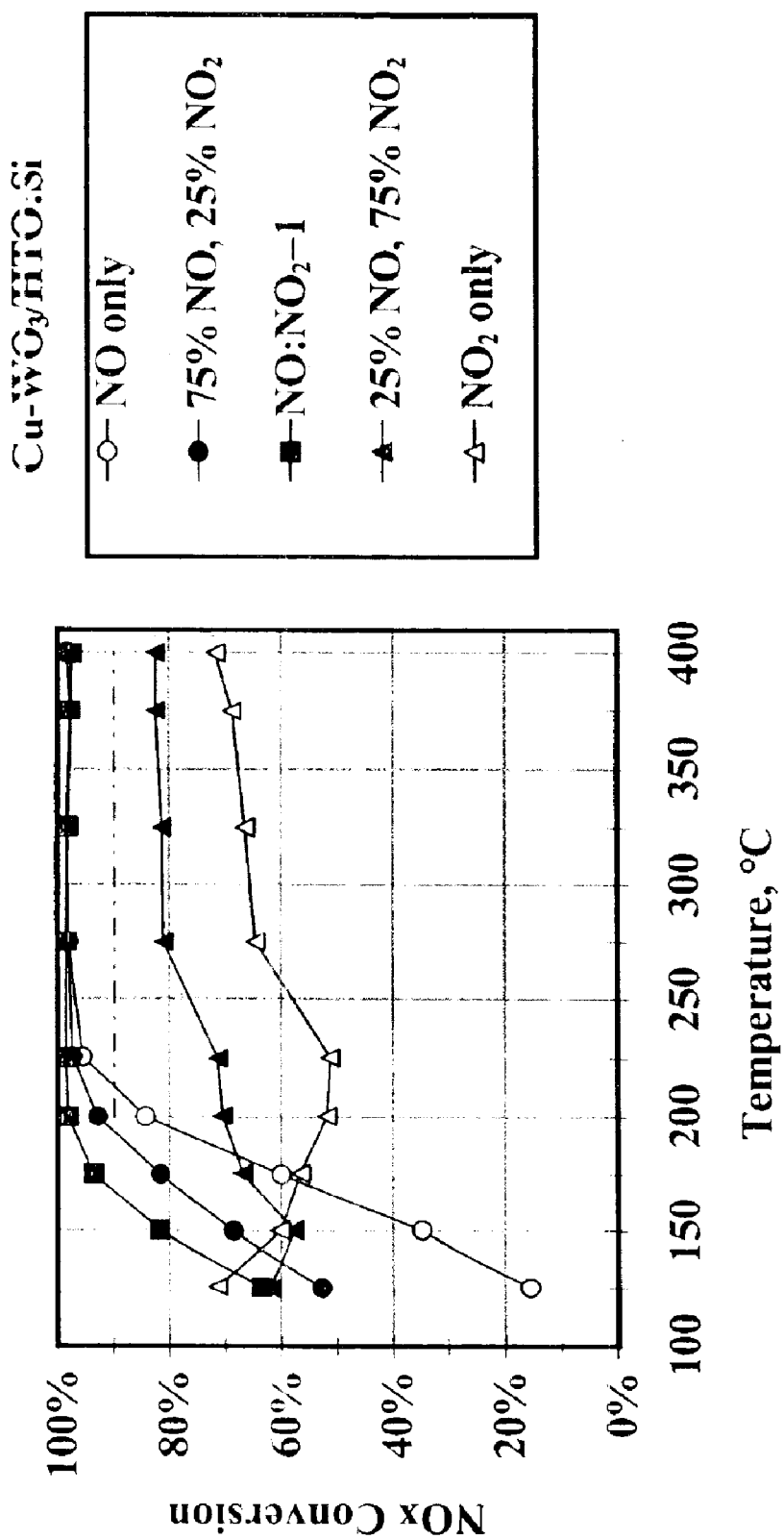
FIG. 15 illustrates $NO_x$ conversion profiles for CuO—$WO_3$/HTO:Si in powder form for different $NO:NO_2$ ratios.

Results from varying the $NO:NO_2$ ratio for Cu—$WO_3$/HTO:Si formulations are shown in FIG. 15. When compared to Mn$WO_3$/HTO:Si, Cu-$WO_3$/HTO:Si catalysts have lower activity with the original screening condition with $NO:NO_2=1$; however, they had much better activity with NO only.

Figure 16:
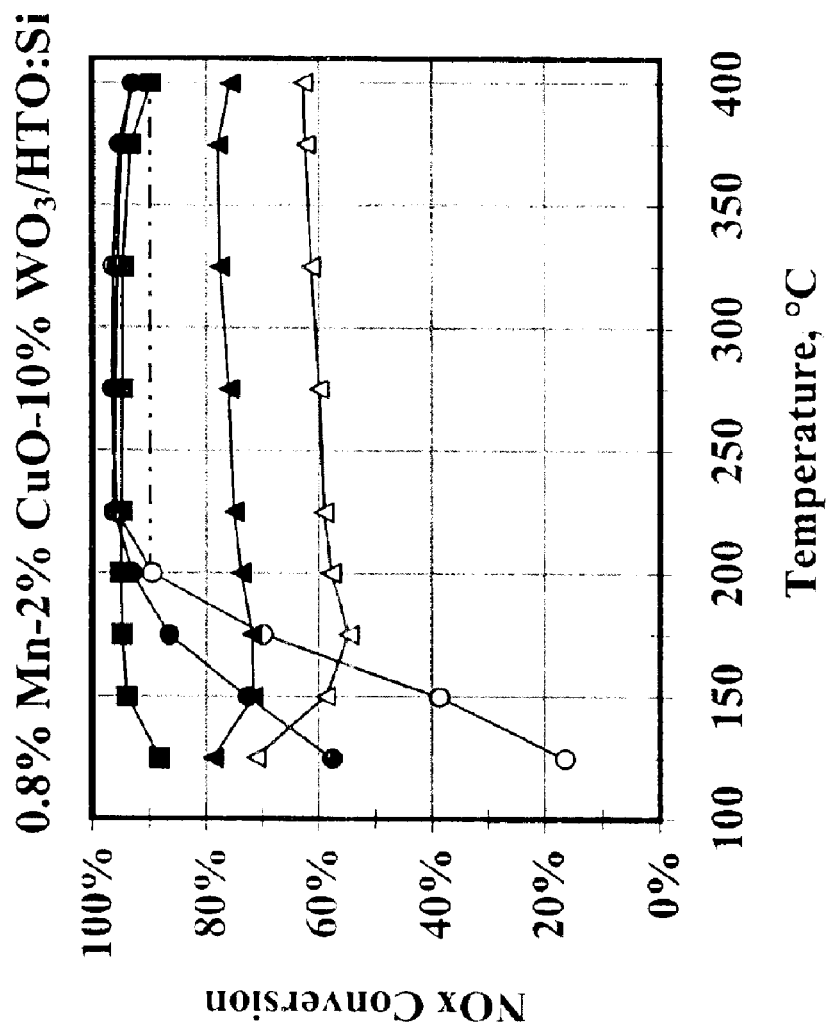
FIG. 16 illustrates $NO_x$ conversion profiles for Mn—CuO—$WO_3$/HTO:Si in powder form for different $NO:NO_2$ ratios.

The Mn—CuO—$WO_3$/HTO:Si catalyst has the advantage of demonstrating both excellent activity with $NO:NO_2=1$ (similar to the Mn—WO₃/HTO:Si catalysts) and good activity for a wide range of NO:NO₂ ratios (like the CuO—WO₃/HTO:Si catalysts) (FIG. 16). In fact, even with the feed NO$_x$ as only NO, 90% conversion can be achieved at 200° C. Selective catalytic reduction of nitrogen oxides using this catalyst formulation is an excellent candidate for possible commercialization.

Figure 17:
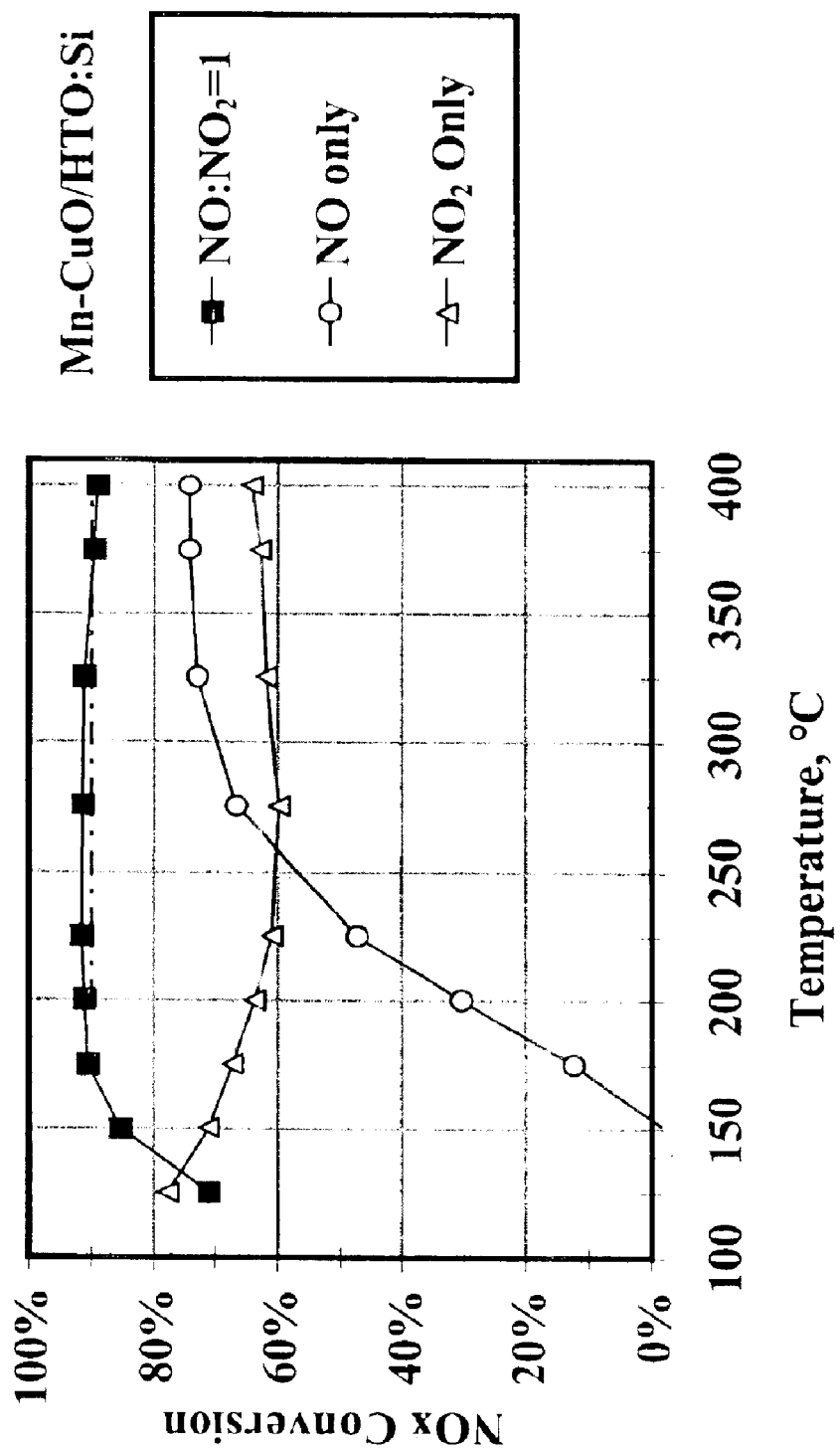
FIG. 17 illustrates $NO_x$ conversion profiles for Mn—Cu/HTO:Si in powder form for different $NO:NO_2$ ratios.

When Mn—CuO/HTO:Si (no WO₃ promoter) was tested under a range of NO:NO₂ ratios, poor activity was seen with the NO only case (FIG. 17). Therefore the promoter phase also increases the activity of the catalyst with NO only.

The non-vanadia catalyst formulations Mn—WO₃/HTO:Si, Mn—WO₃/TiO₂. Mn—WO₃/Al₂O₃, and CuO—WO₃/HTO:Si, Mn—CuO—WO₃/HTO:Si all demonstrated acceptable performance in reducing NO$_x$ in simulated exhaust gas streams using the method of the present invention. The catalysts with the HTO:Si supports used according to the method of the present invention demonstrated advantages over conventional supports.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. A method for catalytically reducing nitrogen oxide compounds, comprising exposing a gas comprising nitrogen oxides, consisting of NO and NO₂, in the presence of NH₃ to a catalyst comprising an active component selected from CuO, Mn, and oxides of Mn on a hydrous metal oxide support.

2. The method of claim 1 wherein the catalyst further comprises a promoter component selected from WO₃ and MoO₃.

3. The method of claim 2 wherein the promoter concentration is less than approximately 5% by weight of the catalyst.

4. The method of claim 1 wherein the hydrous metal oxide support further includes silica.

5. The method of claim 4 wherein the silica concentration comprises an amount effective to thermally stabilize the catalyst for temperatures up to 1000° C.

6. The method of claim 1 wherein the nitrogen oxide have a concentration less than approximately 1000 parts per million.

7. The method of claim 1 where in the gas further comprises compounds selected from sulfur oxides, water vapor, oxygen, carbon dioxide, carbon monoxide and hydrogen.

8. The method of claim 1 wherein the presence of NH₃ occurs from the thermal decomposition of urea.

9. The method of claim 1 wherein the method for catalytically reducing nitrogen oxide compounds occurs at a temperature greater than approximately 100° C.

10. The method of claim 1 wherein the method for catalytically reducing nitrogen oxide compounds occurs at a temperature les than approximately 750° C.

11. The method of claim 1 wherein the activated meta hydrous metal oxide support is selected from a hydrous titanium oxide and a hydrous zirconium oxide.

12. The method of claim 1 wherein the catalytic reduction of the nitrogen oxides has a conversion efficiency to nitrogen of greater than 90 percent.

13. The method of claim 1 wherein the NH₃ concentration is approximately equal to the nitrogen oxides concentration.

14. The method of claim 1 wherein the oxides of Mn are selected from MnO, MnO₂, and MnO$_{1.5}$.

15. The method of claim 1 wherein the catalyst is applied to a ceramic rate.

16. The method of claim 15 wherein the ceramic substrate is selected from a bead, a pellet, or a monolith.

17. The method of claim 16 wherein the monolith is a cordierite honeycomb monolith.

* * * * *